United States Patent
Ito et al.

(10) Patent No.: US 7,538,057 B2
(45) Date of Patent: *May 26, 2009

(54) CERAMIC ELECTRONIC DEVICE AND THE PRODUCTION METHOD

(75) Inventors: Kazushige Ito, Chuo-ku (JP); Daisuke Iwanaga, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 11/150,226

(22) Filed: Jun. 13, 2005

(65) Prior Publication Data

US 2005/0282403 A1 Dec. 22, 2005

(30) Foreign Application Priority Data

Jun. 18, 2004 (JP) .............................. 2004-180978

(51) Int. Cl.
*C04B 35/468* (2006.01)
(52) U.S. Cl. ..................... 501/137; 501/138; 501/139; 361/321.4; 264/615
(58) Field of Classification Search ................. 501/137, 501/138, 139; 361/321.4; 264/615
See application file for complete search history.

(56) References Cited

U.S. PATENT DOCUMENTS

| | | | |
|---|---|---|---|
| 5,319,517 A * | 6/1994 | Nomura et al. .......... | 361/321.4 |
| 6,268,054 B1 | 7/2001 | Costantino et al. | |
| 6,270,716 B1 | 8/2001 | Sugimoto | |
| 6,301,092 B1 * | 10/2001 | Hata et al. ............... | 361/321.2 |
| 6,510,040 B1 | 1/2003 | Sato et al. | |
| 6,733,897 B2 * | 5/2004 | Choi et al. .................. | 428/472 |
| 6,900,977 B2 * | 5/2005 | Nakamura et al. ........ | 361/321.2 |
| 6,917,513 B1 * | 7/2005 | Kim et al. ................. | 361/321.2 |
| 6,995,968 B2 * | 2/2006 | Ito et al. .................... | 361/321.2 |
| 2002/0013213 A1 | 1/2002 | Sato et al. | |

FOREIGN PATENT DOCUMENTS

| | | |
|---|---|---|
| EP | 0 877 399 A2 | 11/1998 |
| EP | 1 043 739 A1 | 10/2000 |
| EP | 1 327 616 A | 7/2003 |
| GB | 2 351 182 A | 12/2000 |
| JP | 61-19005 | 1/1986 |
| JP | A-06-275459 | 9/1994 |
| JP | A 09-097734 | 4/1997 |
| JP | A 10-074666 | 3/1998 |
| JP | A 2001-006966 | 1/2001 |
| JP | A 2001-977772 | 4/2001 |
| JP | A-2004-063912 | 2/2004 |
| JP | A-2004-155625 | 6/2004 |
| WO | WO 99/18587 | 4/1999 |

* cited by examiner

*Primary Examiner*—Karl E Group
(74) *Attorney, Agent, or Firm*—Oliff & Berridge, PLC

(57) ABSTRACT

A ceramic electronic device having a dielectric layer, wherein the dielectric layer includes a main component containing a $(Ba, Ca (Ti, Zr)O_3$ based material and a subcomponent containing an oxide of Si; and a content of the Si oxide is 0 to 0.4 wt % (note that 0 is not included) with respect to the entire dielectric layer; and preferably the dielectric layer has a segregation phase; and the segregation phase contains an oxide of Si and substantially not containing an oxide of Li; by which it is possible to provide a ceramic electronic device, such as a multilayer ceramic capacitor, having a low IR defect rate (initial insulation resistance defect rate), excellent high temperature load lifetime and high reliability.

6 Claims, 2 Drawing Sheets

CERAMIC ELECTRONIC DEVICE AND THE PRODUCTION METHOD

BACKGROUND OF THE INVENTION

1. Field of the Invention

The present invention relates to a ceramic electronic device, such as a multilayer ceramic capacitor, and the production method, and particularly relates to a ceramic electronic device having a low IR defect rate (initial insulation resistance defect rate), excellent high temperature load lifetime and high reliability and the production method.

2. Description of the Related Art

The multilayer ceramic capacitor is widely used as a highly reliable compact electronic device having a large capacity, and the number to be used in an electric apparatus and electronic apparatus is also large. In recent years, as apparatuses becoming more compact with higher performance, demands for a multilayer ceramic capacitor to be more compact, larger in capacity, lower in price, and higher in reliability have increasingly become stronger.

A multilayer ceramic capacitor is normally produced by stacking an internal electrode paste and a dielectric slurry (paste) by the sheet method or printing method, etc. and firing the result. Generally, Pd and a Pd alloy have been used for the internal electrode, but due to the high price of Pd, relatively inexpensive Ni and a Ni alloy have come to be used. In the case of forming the internal electrode by Ni or a Ni alloy, there is a disadvantage that electrodes are oxidized when fired in the air. Therefore, after performing binder removal, it is generally fired under a lower oxygen pressure than an equilibrium oxygen partial pressure of Ni and NiO and subjected to thermal treatment thereafter to re-oxidize the dielectric layer.

However, when fired in a reducing atmosphere, there was a disadvantage that the dielectric layer was reduced and the insulation resistance (IR) becomes small. Therefore, a reduction-resistant dielectric material, which is not reduced even when fired in a reducing atmosphere, has been proposed (for example, the Japanese Unexamined Patent Publication Nos. 9-97734, 10-74666 and 2001-6966).

The Japanese Unexamined Patent Publication Nos. 9-97734 and 10-74666 disclose a dielectric layer having a segregation phase containing at least two kinds of oxides among an oxide of Li, oxide of Si and oxide of B. According to these articles, as a result that the segregation phase as above is included in a dielectric layer, a moving degree of electron moving in a grain boundary layer can be made lower and reliability under a high temperature and high voltage can be improved.

However, in the Japanese Unexamined Patent Publication Nos. 9-97734 and 10-74666, because the segregation phase contains an oxide of Li, $Li_2O$ vaporizes easily, voids (air-gaps) are generated easily, it is affected by temperature, and ion migration is easily caused, so that an affect of improving the high temperature load lifetime is insufficient. Also, in these articles, the IR defect rate (initial insulation resistance defect rate) is not improved, so that there are concerns that the IR defect rate declines when the dielectric layer is made thin.

Also, the Japanese unexamined Patent Publication No. 2001-6966 discloses a dielectric layer having a segregation phase (secondary phase) containing at least a rare earth and, furthermore, a glass component, wherein $SiO_2$ or $B_2O_3$ is the main component. According to the article, a ceramic capacitor having excellent lifetime characteristics and whether resistance can be obtained even if fired in a reducing atmosphere.

However, in the Japanese Unexamined Patent Publication No. 2001-6966, the inventors clearly describes that there is a disadvantage that the IR defect rate becomes high when it is made to be thin as 4 μm or thinner because B (boron) is used and the composition of grain boundary becomes uneven.

SUMMARY OF THE INVENTION

The present invention was made in consideration of the above circumstances and has as an object thereof to provide a ceramic electronic device having a low IR defect rate (initial insulation resistance defect rate), excellent high temperature load lifetime and high reliability and the production method.

To attain the above object, there is provided a ceramic electronic device having a dielectric layer, wherein:

the dielectric layer includes a main component containing a (Ba, Ca) (Ti, Zr)$O_2$ based material and a subcomponent containing an oxide of Si; and a content of the Si oxide is 0 to 0.4 wt % (note that 0 is not included) with respect to the entire dielectric layer.

In the present invention, the lower limit of a content of the Si oxide is preferably 0.01 wt % or more and more preferably 0.05 wt % or more, and the upper limit is preferably less than 0.4 wt % and more preferably 0.2 wt % or less, When the content of the Si oxide is too great, the relative permittivity tends to decline, while when the Si oxide is not added to the dielectric layer, sinterability of the dielectric layer deteriorates and sintering becomes difficult.

In the present invention, the dielectric layer preferably has a segregation phase; and particularly, it is more preferable that the segregation phase contains an oxide of Si and substantially not containing an oxide of Li.

In the present invention, the segregation phase is a part wherein an oxide of Si and other additive subcomponents are segregated and these additive subcomponents exist at higher concentration comparing with those in a main phase composed mainly of a main component. Also, in the present invention, the expression "substantially not including an oxide of Li" means an oxide of Li by an amount of exceeding an impurity level is not included, that is, it may be included as far as it is an amount of an impurity level (for example, a content in the segregation phase is 0.001 mol % or less).

In the present invention, the segregation phase contains an oxide of Si and substantially not containing an oxide of Li, so that it is possible to reduce the IR defect rate (initial insulation resistance defect rate) and improve high temperature load lifetime, Note that it is sufficient if the Li oxide is substantially not contained at least in the segregation phase, but it is more preferable that it is substantially not contained in other parts than the segregation phase in the dielectric layer, for example, in the main phase.

In the present invention, a C.V. value of a distribution of $SiO_2$ calculated by the formula (1) below from standard deviation of detection strength and average detection strength x of the $SiO_2$ distribution in the dielectric layer is preferably 250 or lower, more preferably 220 or lower and furthermore preferably 200 or lower.

$$C.V. \text{ value} = (\text{standard deviation } \sigma \text{ of detection strength/average detection strength } x) \times 100 \quad (1)$$

The above C.V. value (coefficient of variation) is a value obtained by dividing the standard deviation σ of the detection strength of a distribution of elements in the dielectric layer by the average detection strength x of the element distribution in the dielectric layer and indicates the dispersion degree of the elements. The lower the value is, the higher the dispersion degree is. The C.V. value of the $SiO_2$ distribution is preferably low, that is, the dispersion degree of $SiO_2$ is preferably high in the present invention. Note that when the Si oxide included in the dielectric layer exists mainly in the segregation phase, the C.V. value of the distribution of the $SiO_2$ indicates a C.V. value of a distribution of the segregation phase.

The C.V. value of the $SiO_2$ distribution in the dielectric layer can be measured, for example, by the EP (Electron Probe Micro Analysis) of a section of the dielectric layer. Namely, element mapping of Si elements is performed by the EPMA analysis, peak strength of the Si elements in each portion is measured, standard deviation σ of detection strength and an average detection strength x of the Si elements in the dielectric layer are obtained from the peak strength, and the C.V. value can be calculated from the above formula.

In the present invention, the smaller a diameter of the segregation phase is, the more preferable, and particularly, the maximum diameter of the segregation phase existing in the dielectric layer is preferably ½ of a thickness of the dielectric layer or smaller, and more preferably ⅓ or smaller. When the maximum diameter of the segregation phase is too large, the short-circuiting defeat rate tends to deteriorate. Note that the maximum diameter of the segregation phase means a diameter of a segregation phase having the maximum diameter among segregation phases existing in the dielectric layer in the present invention.

Preferably, the ratio of the segregation phase in the dielectric layer is 15 volumes or lower, and more preferably 10 volume % or lower with respect to the entire dielectric layer. When the ratio of the segregation phase in the dielectric layer is too high, the high temperature load lifetime tends to deteriorate.

Preferably, the largest area of the segregation phase is 2.5 $\mu m^2$ or smaller, and more preferably 2.0 $\mu m^2$ or smaller. When the maximum area of the segregation phase is too large, the short-circuiting defect rate tends to deteriorate. Note that the maximum area of the segregation phase means an area of a segregation phase having the largest area among segregation phases existing in the dielectric layer in the present invention.

Preferably, the (Ba, Ca)(Ti, Zr)$O_3$ based material is a material expressed by a composition formula $\{\{Ba_{(1-x)}Ca_x\}O\}_A\{Ti_{(1-y-z)}Zr_yMg_z\}_BO_2$ (note that A, B, x, y and z are $0.995 \leq A/B \leq 1.020$, $0.0001 \leq z \leq 0.07$, $0.1 \leq y \leq 0.3$ and $0.00005 \leq z \leq 0.01$).

The $\{\{Ba_{(1-x)}Ca_x\}O\}_A\{Ti_{(1-y-z)}Zr_yMg_z\}_BO_2$ is a dielectric oxide, wherein a site of Ti and/or Zr is substituted by Mg in the (Ba, Ca) (Ti, Zr)$O_3$ based material. Mg has an effect of reducing the IR defect rate, and by substituting a site of Ti and/or Zr by Mg, a reduction of the IR defect rate can be attained.

Preferably, the dielectric layer further contains an oxide of Mn, an oxide of Y and an oxide of V as subcomponents respectively by 0.008 to 0.33 wt % in terms of MnO
0.047 to 0.47 wt % in terms of $Y_2O_3$ and
0.005 to 0.30 wt % in terms of $V_2O_5$ with respect to the entire dielectric layer.

Preferably, the dielectric layer furthermore contains an oxide of W as a subcomponent by 0.005 to 0.3 wt % in terms of $WO_3$ with respect to the entire dielectric layer.

Preferably, a thickness of the dielectric layer is 4.5 μm or thinner and more preferably 3.5 μm or thinner. According to the present invention, it is possible to reduce the IR defeat rate (initial insulation resistance defect rate) and improve the high temperature load lifetime, so that the dielectric layer can be made thin and a highly reliable compact ceramic electronic device having a large capacity.

According to the present invention, there is provided a production method of a ceramic electronic device having a dielectric layer, wherein:

a granular oxide of Si having a maximum particle diameter of 0.3 to 2.2 μm is used as a subcomponent material for forming the dielectric layer; and a content of the Si oxide is 0 to 0.4 wt % (note that 0 is not included) in terms of $SiO_2$ with respect to the entire dielectric layer.

In the production method of the present invention, an oxide of Si having the maximum particle diameter within the above range is used as a granular oxide of Si as a subcomponent material. Therefore, a dispersion state (distribution state) of the segregation phase containing the Si oxide in the dielectric layer can be controlled, so that it is possible to reduce the IR defect rate (initial insulation resistance defect rate) and improve the high temperature load lifetime.

Note that the maximum particle diameter of the Si oxide used in the production method of the present invention means the maximum particle diameter among "particle diameters of actual particles" measured by SEM observation, etc. Also, "particle diameters of actual particles" means, for example in the case where there is an aggregation in particles, particle diameters of respective particles composing the aggregation and does not mean a particle diameter of the aggregation itself.

Alternately, according to the present invention, there is provided a production method of a ceramic electronic device having a dielectric layer, wherein:

a granular oxide of Si, wherein a difference (D100-D50) of a D50 diameter of 50% equivalent diameter and a D100 diameter of 100% equivalent diameter is 1.5 μm or smaller, is used as a subcomponent material for forming the dielectric layer; and a content of the Si oxide is 0 to 0.4 wt % (note that 0 is not included) in terms of $SiO_2$ with respect to the entire dielectric layer.

In the production method of the present invention, an oxide of Si, wherein the difference (D100-D50) of the D50 diameter and the D100 diameter is within the above range, is used as a granular oxide of Si as a subcomponent material, Consequently, a dispersion state (distribution state) of the segregation phase containing the Si oxide in the dielectric layer can be controlled and it is possible to reduce the IR defect rate (initial insulation resistance defect rate) and improve the high temperature load lifetime.

Note that the above D50 diameter and the D100 diameter respectively mean a volume-reduced cumulative 50% diameter and volume-reduced cumulative 100% diameter and are normally measured by the laser diffraction method, etc.

In the production method of the present invention, preferably, in a production method of a ceramic electronic device having a dielectric layer, a granular oxide of Si, wherein the maximum particle diameter is 0.3 to 2.2 μm and a difference (D100-D50) of a D50 diameter of 50% equivalent diameter and a D100 diameter of 100% equivalent diameter is 1.5 μm or smaller, is used as a subcomponent material for forming the dielectric layer; and a content of the Si oxide is 0 to 0.4 wt % (note that 0 is not included) in terms of $SiO_2$ with respect to the entire dielectric layer.

In the production method of the present invention, preferably, a (Ba, Ca)(Ti, Zr)$O_3$ based material is used as a main component included in the dielectric layer.

In the production method of the present invention, preferably, the (Ba, Ca) (Ti, Zr)C based material is a material expressed by a composition formula $\{\{Ba_{(1-x)}Ca_x\}O\}_A\{Ti_{(1-y-z)}Zr_yMg_z\}_BO_2$ (note that A, B, X, Y and z are $0.995 \leq A/B \leq 1.020$, $0.0001 \leq x \leq 0.07$, $0.1 \leq y \leq 0.3$ and $0.0005 \leq z \leq 0.01$).

The Ceramic electronic device according to the present invention is not particularly limited, and a multilayer ceramic capacitor, piezoelectric device, chip inductor, chip varistor, chip thermistor, chip resistor, and other surface mounted chip electronic devices (SMD) may be mentioned.

According to the present invention, a ceramic electronic device, such as a multilayer ceramic capacitor, having a low IR defect rate (initial insulation resistance defect rate), excellent high temperature load lifetime and high reliability and the production method can be provided.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Multilayer Ceramic Capacitor 1

Figure 1:
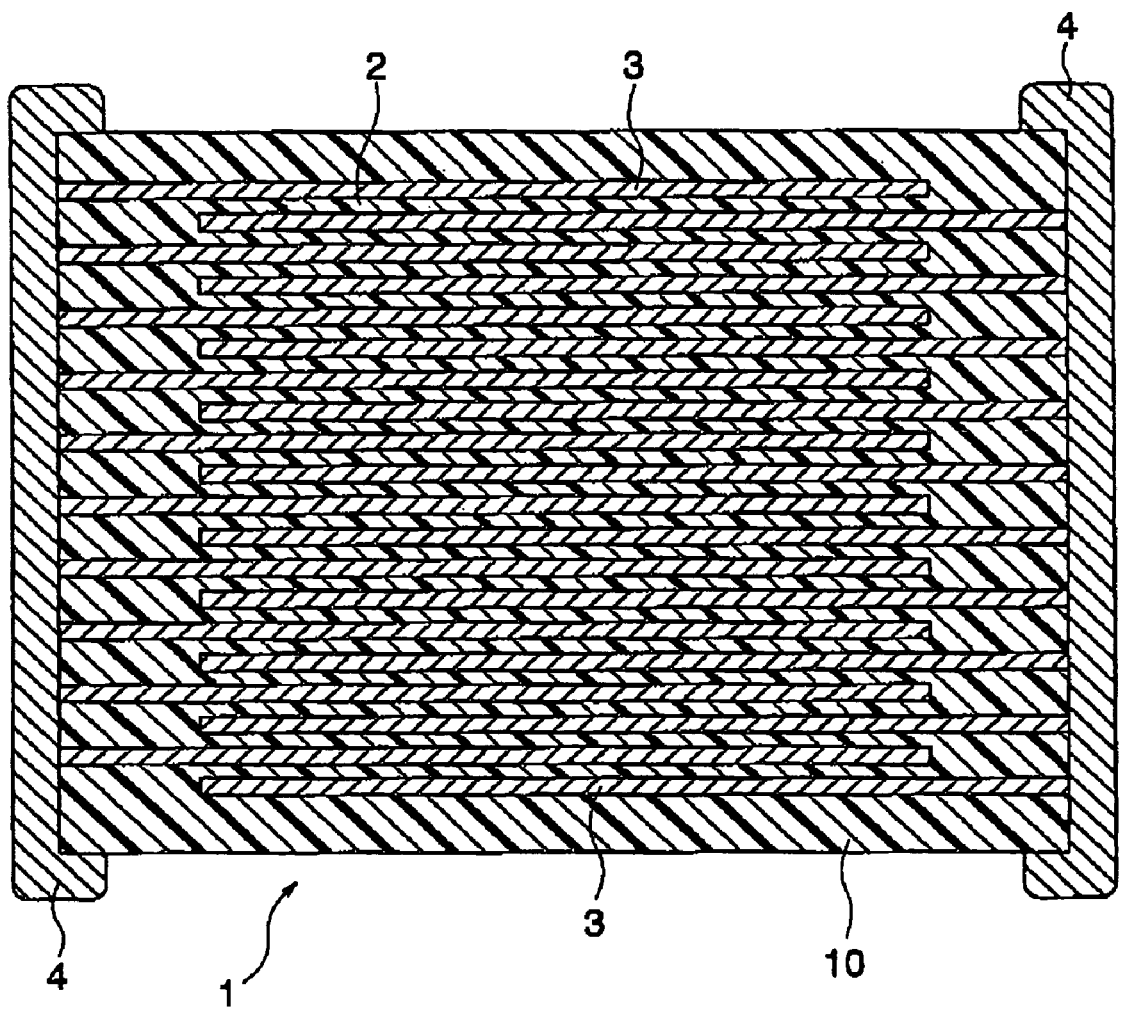
FIG. 1 is a sectional view of a multilayer ceramic capacitor according to an embodiment of the present invention.

As shown in FIG. 1, a multilayer ceramic capacitor 1 according to an embodiment of the present invention comprises a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. A shape of the capacitor element body 10 is not particularly limited, but is normally rectangular parallelepiped, Also, the size is not particularly limited and may be a suitable size in accordance with the use object.

The internal electrode layers 3 are stacked, so that the respective end surfaces are exposed alternately to surfaces of two facing end portions of the capacitor element body 10. The pair of external electrodes 4 is formed on both end portions of the capacitor element body 10 and connected to the exposed end surfaces of the alternately arranged internal electrode layers 3, so that a capacitor circuit is configured.

Dielectric Layer 2

The dielectric layer 2 includes a dielectric ceramic composition.

In the present embodiment, the dielectric ceramic composition contains a main component including a (Ba, Ca) (Ti, Zr)$O_3$ based material, an oxide of Si, and other subcomponents.

As the (Ba, Ca) (Ti, Zr)$O_3$ based material included in the main component, a dielectric oxide having a composition expressed by $\{\{Ba_{(1-x)}Ca_x\}O\}_A\{Ti_{(1-y-z)}Zr_yMg_z\}_BO_2$, wherein a site of Ti and/or Zr is substituted by Mg is preferable.

In the above formula, "x" expresses the Ca ratio, which is preferably 0.0001 or higher and 0.07 or lower, more preferably 0.0001 or higher and lower than 0.05. Ca mainly has an effect of improving the sintering stability and improving the insulation resistance value. When "x" becomes lower than 0.0001, it is liable that abnormal grain growth of the dielectric layer easily arises at firing, while when "x" exceeds 0.07, the relative permittivity tends to become low.

In the above formula, "z" expresses the Mg ratio, which is preferably 0.0005 or higher and 0.01 or lower, and more preferably 0.003 or higher and 0.01 or lower. Mg has an effect of reducing the IR defect rate. When "z" becomes lower than 0.0005, the IR defect rate tends to be high, while when "z" exceeds 0.01, the relative permittivity tends to become low.

Also, A/B as a ratio of an A site and B site in the above composition formula is preferably 0.995 or higher and 1.020 or lower, and more preferably 1.000 or higher and 1.015 or lower. When the A/B becomes lower than 0.995, it is liable that abnormal grain growth of the dielectric layer easily arises at firing and the insulation resistance value becomes low, while when A/B exceeds 1.020, sinterability tends to decline and a fine sintered body is hard to be obtained.

The dielectric layer 2 includes an oxide of Si and other subcomponents besides the above main component.

A content of the Si oxide is 0 to 0.4 wt % (note that 0 is not included) in terms of $SiO_2$ with respect to the entire dielectric layer, and the lower limit of the content is preferably 0.01 wt % or more, and more preferably 0.05 wt % or more; and the upper limit is preferably less than 0.4 wt %, and more preferably 0.2 wt % or less The Si oxide acts as a sintering auxiliary. When a content of the Si oxide is too much, the relative permittivity tends to decline, while when the Si oxide is not added to the dielectric layer, sinterability of the dielectric layer declines and sintering becomes difficult. Note that, in the present embodiment, the Si oxide is mainly included in the segregation phase, which will be explained in detail later on.

In the present embodiment, it is preferable that an oxide of Mn, oxide of Y, oxide of V and oxide of W are included as subcomponents other than the Si oxide.

The Mn oxide exhibits an effect of accelerating sintering and improving the IR and IR lifetime. A content of the Mn oxide is preferably 0.008 to 0.33 wt %, and more preferably 0.2 to 0.33 wt % in terms of MnO with respect to the entire dielectric layer. When the content of the Mn oxide is too small, it is liable that the effect of adding it is not obtained, while when too much, the relative permittivity tends to decline.

The Y oxide mainly exhibits an effect of improving the IR lifetime. A content of the Y oxide is preferably 0.047 to 0.47 wt %, and more preferably 0.2 to 0.4 wt % in terms of $Y_2O_3$ with respect to the entire dielectric layer. When the content of the Y oxide is too mall, it is liable that an effect of adding it is not obtained and the IR lifetime deteriorates, while when too much, the sinterability tends to decline.

The V oxide exhibits an effect of improving the IR lifetime. A content of the V oxide is preferably 0.005 to 0.30 wt %, more preferably 0.01 to 0.2 wt %, and furthermore preferably 0.01 to 0.1 wt % in terms of $V_2O_5$ with respect to the entire dielectric layer. When the content of the V oxide is too small, it is liable that an effect of adding it is not obtained, while when too much, the IR tends to decline remarkably.

The W oxide exhibits an effect of equalizing capacity-temperature characteristic at the Curie temperature or higher and an effect of improving the IR lifetime. A content of the W oxide is preferably 0.005 to 0.3 wt %, more preferably 0.01 to 0.2 wt % and furthermore preferably 0.01 to 0.1 wt % in term of $WO_3$ with respect to the entire dielectric layer. When the content of the W oxide is too small, it is liable that the effect of adding it is not obtained, while when too much, the IR tends to decline remarkably.

Note that, in the present specification, the respective oxides composing the main component and the subcomponents are expressed by stoichiometric compositions, but an oxidation state of each oxide may be deviated from the stoichiometric composition. Note that the above ratios of the subcomponents are obtained by converting a metal amount contained in an oxide composing each subcomponent to the oxide having the above stoichiometric composition.

In the present embodiment, the dielectric layer 2 has a segregation phase including an oxide of Si but substantially not including an oxide of Li.

The segregation phase is a part, where additive subcomponents, such as the Si oxide, are segregated and these subcomponents exist at a high concentration comparing with those in the main phase composed mainly of the main component. Also, in the present embodiment, the expression "substantially not including an oxide of Li" means an oxide of Li by an amount of exceeding an impurity level is not included, that is, it may be included as far as it is an amount of an impurity level (for example, a content in the segregation phase is 0.001 mol % or less). When the Li oxide in an amount exceeding the impurity level is included in the segregation phase, the high temperature load lifetime deteriorates.

In the present embodiment, a C.V. value of a distribution of $SiO_2$ in the dielectric layer calculated by the formula (1) below from standard deviation σ of detection strength and an average detection strength x of the $SiO_2$ distribution in the dielectric layer in preferably 250 or lower, more preferably 220 or lower and furthermore preferably 200 or lower.

$$C.V. \text{ value} = (\text{standard deviation } \sigma \text{ of detection strength/average detection strength } x) \times 100 \quad (1)$$

The C.V. value (variable coefficient) as above is a value obtained by dividing the standard deviation σ of the detection strength of the $SiO_2$ distribution in the dielectric layer by the average detection strength x of the $SiO_2$ distribution in the dielectric layer and indicates the dispersion degree of $SiO_2$. The lower the value is, the higher the dispersing degree is. In the present embodiment, the C.V. value of the $SiO_2$ distribution is preferably low, that is, the dispersing degree of $SiO_2$ is preferably high. Note that since the Si oxide included in the dielectric layer 2 is included mainly in the segregation phase in the present embodiment, the C.V. value of the distribution of the Si oxide indicates a C.V. value of a distribution of the segregation phase.

The C.V. value of the $SiO_2$ distribution can be measured, for example, by the EPMA (Electron Probe Micro Analysis) of a section of the dielectric layer 2. Namely, element mapping of Si elements is performed by the EPMA analysis, peak strength of the Si elements in each portion is measured, standard deviation σ of detection strength and an average detection strength x or the Si elements in the dielectric layer 2 are obtained from the peak strength, and the C.V. value can be calculated from the above formula.

Also, the smaller a diameter of the segregation phase is, the more preferable. Particularly, the maximum diameter of the segregation phase existing in the dielectric layer 2 is preferably ½ of a thickness of the dielectric layer or smaller, and more preferably ⅓ or smaller. When the maximum diameter of the segregation phase is too large, the short-circuiting defect rate tends to deteriorate. Note that the maximum diameter of the segregation phase means a diameter of the segregation phase having the maximum diameter among segregation phases existing in the dielectric layer 2 in the present embodiment.

Also, it is preferable that the ratio of the segregation phase in the dielectric layer 2 is 15 volume % or lower, and more preferably 10 volume % or lower with respect to the entire dielectric layer. When the ratio of the segregation phase in the dielectric layer 2 is too high, the high temperature load lifetime tends to deteriorate.

Also, the largest area of the segregation phase is preferably 2.5 μm² or smaller, and more preferably 2.0 μm² or smaller. When the maximum area of the segregation phase is too large, the short-circuiting defect rate tends to deteriorate. Note that the maximum area of the segregation phase means an area of a segregation phase having the largest area among segregation phases existing in the dielectric layer 2.

A thickness of the dielectric layer 2 is not particularly limited, but is preferably 4.5 μm or thinner, more preferably 3.5 μm or thinner and furthermore preferably 3.0 μm or thinner per one layer. The lower limit of the thickness is not particularly limited, but is, for example, 0.5 μm or so.

The number of stacked layers of the dielectric layers 2 is not particularly limited, but is preferably 20 or more, more preferably 50 or more, and particularly preferably 100 or more. The upper limit of the number of stacked layers is not particularly limited, but is, for example, 2000 or so.

Internal Electrode Layer 3

A conductive material included in the internal electrode layer 3 is not particularly limited, but since components of the dielectric layer 2 has reduction-resistance, relatively inexpensive base metals may be used. As base metals to be used as the conductive material, Ni or a Ni alloy are preferable. As the Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, by 0.1 wt % or so. A thickness of the internal electrode layer 3 may be suitably determined in accordance with the use object, etc., but normally it is preferably 0.1 to 3 μm, and particularly 0.2 to 2.0 μm or so.

External Electrode 4

A conductive material included in the external electrode 4 is not particularly limited, but inexpensive Ni, Cu and alloys of these may be used in the present invention. A thickness of the external electrode 4 may be suitably determined in accordance with the use object, etc., but normally 10 to 50 μm or so is preferable.

Production Method of Multilayer Ceramic Capacitor

A multilayer ceramic capacitor in the present embodiment is produced by preparing a green chip by the normal printing method or sheet method using a paste, firing the same, then, printing or transferring external electrodes and firing in the same way as in a multilayer ceramic capacitor of the related art. Below, the production method will be explained specifically.

First, dielectric ceramic composition powder included in the dielectric layer paste is prepared and made to be a paint to fabricate a dielectric layer paste.

The dielectric layer paste may be an organic paint obtained by kneading the dielectric ceramic composition powder with an organic vehicle or a water based paint, As the dielectric ceramic composition powder, the above oxides, mixtures thereof, and composite oxides may be used, and also it may be suitably selected from a variety of compounds to be the above oxides, and composite oxides by firing, such as carbonate, oxalate, nitrate, hydroxide and organic metal compound, etc., and mixed for use, A content of each compound in the dielectric ceramic composition powder may be determined, so that a composition of the above dielectric ceramic composition after firing is obtained. In a state before being made to be a paint, a particle diameter of the dielectric ceramic composition powder is normally 0.1 to 1 µm or so in the average particle diameter.

In the present embodiment, as a material of the Si oxide included as a subcomponent in the dielectric layer 2, a granular Si oxide having a maximum particle diameter of 0.3 to 2.2 µm, and preferably 0.5 to 1.7 µm is used. By using the granular Si oxide having a maximum particle diameter of the above predetermined ranges, a dispersion state (distribution state) of the segregation phase including the Si oxide in the dielectric layer can be controlled, the IR defect rate (initial insulation resistance defect rate) is reduced, and the high temperature load lifetime can be improved.

When the maximum particle diameter of the Si oxide to be used as a subcomponent material is too small, aggregation of particles arises and it is liable that the dispersion degree declines and the IR defect rate and the high temperature load lifetime deteriorate. On the other hand, when the maximum particle diameter is too large, a size of particles themselves becomes large, so that the particles are hard to be dispersed uniformly and the IR defect rate and the high temperature load lifetime tend to deteriorate. Note that the maximum particle diameter of the Si oxide means the maximum particle diameter among "particle diameters of actual particles" measured by SEM observation, etc. in the present embodiment. Also, "particle diameters of actual particles" means, for example in the case where there is an aggregation in particles, particle diameters of respective particles composing the aggregation and does not mean a particle diameter of the aggregation itself.

Alternately, in the present embodiment, as a material of the Si oxide included as a subcomponent in the above dielectric layer 2, a granular Si oxide, wherein a difference (D100-D50) of a D50 diameter of 50% equivalent diameter and a D100 diameter of 100% equivalent diameter is 1.5 µm or smaller, and preferably 1.0 µm or smaller, is used. Therefore, it is possible to control the dispersion state (distribution state) of the segregation phase including the Si oxide in the dielectric layer, so that the IR defect rate (initial insulation resistance defect rate) can be reduced, and the high temperature load lifetime can be improved. When the difference (D100-D50) between the D50 diameter and the D100 diameter is too large, unevenness of a particle distribution becomes large, dispersion of the particles becomes difficult, and the IR defect rate and the high temperature load lifetime tend to deteriorate.

Note that the above D50 diameter and the D100 diameter respectively mean a volume-reduced cumulative 50% diameter and volume-reduced cumulative 100% diameter and are normally measured by the laser diffraction method, etc. The laser diffraction method is a measurement method using diffraction and scattering caused by irradiating a light to particles and, for example when there is an aggregation in the particles, a diameter of the aggregation is detected as the particle diameter. Therefore, for example, even in the case where the actual particle diameters (that is, particle diameters in a not aggregated state) are small, when there are a large number of aggregations in the particles and the degree of aggregation is high, values of the D50 diameter and D100 diameter become larger comparing with the actual particle diameters. Along therewith, the difference (D100-D50) between the D50 diameter and the D100 diameter also becomes large and, in this case, the IR defect rate and the high temperature load lifetime tend to deteriorate.

Note that, in the present embodiment, the above D50 and D100 of the Si oxide to be used as a material are not particularly limited but the D50 diameter is preferably 0.3 to 0.8 µm or so and D100 diameter is preferably 1.0 to 1.7 µm or so.

Also, in the present embodiment, as a material of the Si oxide as above, it is particularly preferable to use a granular Si oxide, wherein the maximum particle diameter is in the above range and the difference (D100-D50) between the D50 diameter and the D100 diameter is in the above range. By using a Si oxide as such, the effect of the present invention can be particularly enhanced.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent to be used is not particularly limited and may be suitably selected from a variety of organic solvents, such as terpineol, butyl carbitol, acetone, and toluene, in accordance with a method to be used, such as the printing method and sheet method.

Also, when using a water based paint as a dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle.

The external electrode paste may be fabricated in the same way as the above internal electrode layer paste.

A content of the organic vehicle in the above variety of pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using the printing method, the dielectric layer paste and the internal electrode layer paste are stacked and printed on a substrate, such as PET, cut to be a predetermined shape and removed from the substrate to obtain a green chip.

When using the sheet method, the dielectric layer paste is used to form a green sheet, the internal electrode layer paste is printed thereon, then, the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-46}$ to $10^5$ Pa. When the oxygen partial pressure is lower than the above range, the binder removal effect declines. While, when the oxygen partial pressure exceeds the above range, the internal electrode layer tends to be oxidized.

Also, as other binder removal conditions, the temperature rising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the binder removal processing atmosphere is preferably in the air or a reducing atmosphere, and a preferable atmosphere gas in the reducing atmosphere is, for example, a wet mixed gas of $N_2$ and $H_2$.

An atmosphere when firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-9}$ to $10^{-4}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., and more preferably 1200 to 1300° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-3}$ Pa or higher, and particularly preferably $10^{-2}$ to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layer becomes insufficient, so that the IR becomes low and the IR lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the IR lifetime are easily caused. Note that the annealing may be composed only of a temperature rising step and a temperature lowering step. Namely, the temperature holding time may be zero. In this case, the holding temperature is a synonym of the highest temperature.

As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so.

The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was explained as an example of an electronic device according to the present invention, but an electronic device according to the present invention is not limited to the multilayer ceramic capacitor and may be any as far as it includes a dielectric layer composed of a dielectric ceramic composition having the above composition.

EXAMPLES

Below, the present invention will be explained based on furthermore detailed examples, but the present invention is not limited to the examples.

Example 1

As a main component, a dielectric oxide having a composition expressed by $\{\{Ba_{(1-x)}Ca_x\}O\}_A\{Ti_{(1-y-z)}Zr_yMg_z\}_BO_2$ was prepared by the sol-gel synthetic method, so that marks "x", "y", "z", "A" and "B" indicating composition ratios become the values below.

x=0.01
y=0.18
z≦0.003
A/B=1.004

Next, as a subcomponent, $SiO_2$, MnO, $Y_2O_3$, $V_2O_5$ and $WO_3$ were subjected to wet grinding by a ball mill for 20 hours, preliminary firing at 900° C. for 4 hours in the air, then, wet grinding by a ball mill for 20 hours for disintegrating to obtain additives of the subcomponent. Note that contents of the respective subcomponent materials in the dielectric layer after firing were adjusted to be the amounts below.

$SiO_2$: 0.3 wt %
MnO: 0.2 wt %
$Y_2O_3$: 0.3 wt %
$V_2O_5$: 0.04 wt %
$WO_3$: 0.05 wt %

Then, the main component and the adjusted subcomponents were subjected to wet grinding by a ball mill for 19 hours and dried to obtain a dielectric material.

Note that, in the present example, as $SiO_2$ as a material of the subcomponent, $SiO_2$ having a different maximum particle diameter, D50 diameter and D100 diameter as shown in Table 1 was used to produce each of samples 1 to 8. The maximum particle diameter was obtained by measuring particle diameters by observing each $SiO_2$ material by a scanning electronic microscope (SEM) in a scope of 30 μm×30 μm on freely selected 10 points. Namely, a particle diameter of a particle having the largest particle diameter in the above scopes was used as the maximum particle diameter.

Also, the D50 diameter and D100 diameter of $SiO_2$ were obtained by measuring a volume-reduced cumulative 50% diameter and volume-reduced cumulative 100% diameter of each $SiO_2$ material by the laser diffraction method. Note that, in the present example, in $SiO_2$ used in the samples 4 to 8 in Table 1, the maximum particle diameter of actual particles obtained by the SEM observation and the D100 diameter measured by the laser diffraction method are not identical, but it is considered because an aggregation exists in the $SiO_2$ particles. Particularly, in $SiO_2$ used in the sample 8, the maximum particle diameter of actual particles obtained by the SEM observation and the D100 diameter measured by the laser diffraction method are largely different, and it is confirmed that there are many aggregations and the aggregation degree is high.

Next, by using the obtained dielectric material, 100 parts by weight of the dielectric material, 5.0 parts by weight of an acrylic resin, 2.5 parts by weight of benzyl butyl phthalate, 6.5 parts by weight of mineral spirit, 4.0 parts by weight of acetone, 20.5 parts by weight of toluene, and 41.5 parts by weight of methylethyl ketone were mixed by a ball mill to be a paste, so that a dielectric layer paste was obtained.

Next, 44.6 parts by weight of Ni particles, 52 parts by weight of terpineol, 3 parts by weight of ethyl cellulose, and 0.4 parts by weight of benzotriazole were kneaded by a triple-roll to be a slurry, so that an internal electrode layer paste was obtained.

By using the pastes, a multilayer ceramic capacitor 1 shown in FIG. 1 was produced as explained below.

First, by using the obtained dielectric layer paste, a green sheet was formed on a PET film, after printing the internal electrode layer paste thereon, the sheet was removed from the PET film. Next, the green sheets and protective green sheets (hot printed with the internal electrode layer paste) were stacked and bonded with pressure to obtain a green chip.

Next, the green chip was cut to a predetermined size and subjected to binder removal processing, firing and annealing under the conditions below, so that a multilayer ceramic sintered body was obtained. The binder removal processing condition was the temperature raising rate of 30° C./hour, the holding temperature of 260° C., the temperature holding time of 8 hours, and the atmosphere of in the air. The firing condition was the temperature raising rate of 200° C./hour, the holding temperature of 1245° C., the temperature holding time of 2 hours, cooling rate of 300° C./hour and the atmosphere of wet mixed gas of $N_2$ and $H_2$ (the oxygen partial pressure was $10^{-2}$ Pa). The annealing condition was the temperature raising rate of 200° C./hour, the holding temperature of 1000° C., the temperature holding time of 2 hours, cooling rate of 300° C./hour and the atmosphere of wet $N_2$ gas (the oxygen partial pressure was $10^{-1}$ Pa). Note that a wetter, wherein the water temperature was 5 to 75° C., was used to wet the atmosphere gas at the time of firing and annealing.

Next, after polishing end surfaces of the obtained multilayer ceramic sintered body by sand blasting, In—Ga was applied as external electrodes, so that samples 1 to 8 of the multilayer ceramic capacitor shown in FIG. 1 were obtained.

A size of the obtained capacitor samples was 3.2 mm×1.6 mm×0.6 mm, the number of dielectric layers sandwiched by internal electrode layers was 4, a thickness a thickness between layers) of one dielectric layer was 2.7 μm, and a thickness of one internal electrode layer was 1.2 μm.

Note that a method of measuring the thickness of the dielectric layer was cutting the obtained capacitor sample on a plane vertical to the internal electrodes, obtaining a SEM picture of the cut surface, then, drawing a line vertical to internal electrodes on the SEM picture, and measuring a distance from one internal electrode to adjacent internal electrode. The measurement was made for times and an average of the measured values Was obtained and used as a thickness of the dielectric layer.

The IR defect rate (unevenness of the IR), the high temperature load lifetime (average lifetime) and the C.V. value of $SiO_2$ after firing of the obtained respective capacitor samples were measured by the methods below, respectively.

IR Defect Rate

First, by using an insulation-resistance tester (R8340A made by Advantest Corporation), a direct current of 20V was applied for 60 seconds to 100 capacitor samples at 20° C., and insulation resistance IR after the voltage application was measured. Next, an average value of the insulation resistance values of the measured 100 samples was calculated, samples having a smaller insulation resistance value than the average value by two digits or more (samples having insulation resistance of 1/100 of the average value or smaller) were considered defectives, and the occurrence rate of defectives was used as the IR defect rate. The smaller the value is, the lower the IR defect rate is and the more the good ones are. In the present example, 65% or lower was considered preferable. The results are shown in Table 1.

High Temperature Load Lifetime

A high temperature load lifetime was measured by keeping the capacitor samples in a state of being applied with a direct current voltage of 8.0 V/μm at 160° C. The measurement of the high temperature load lifetime was made on 10 capacitor samples and the evaluation was made by measuring the average lifetime. In the present example, time from start of the application until the insulation resistance is reduced by one digit was defined as the lifetime. The longer the lifetime is, the more preferable. In the present example, it is preferably 3.0 hours or longer, more preferably 5.0 hours or longer, and furthermore preferably 8.0 hours or longer. The results are shown in Table 1.

C.V Value of $SiO_2$ After Firing

First, the EPMA analysis was performed on the dielectric layers of the obtained capacitor samples, and based on the result of element mapping of Si elements, peak strength of the Si elements at each portion on the analysis screen was measured. Next, standard deviation a of detection strength and average detection strength x of a distribution of the Si elements in the dielectric layers were obtained from the peak strength, and the C.V. value of $SiO_2$ after firing was calculated from the standard deviation a and average detection strength x by the formula (1) below. The results are shown in Table 1.

$$C.V. \text{ value} = (\text{standard deviation } \sigma \text{ of detection strength/average detection strength } x) \times 100 \quad (1)$$

TABLE 1

| Sample No. | | Adding Amount [wt %] | SiO₂ Maximum Diameter [μm] | D50 [μm] | D100 [μm] | D100 − D50 [μm] | Firing Temperature [° C.] | IR Defect Rate [%] | Average Lifetime [h] | CV value of Si after Firing [%] |
|---|---|---|---|---|---|---|---|---|---|---|
| 1 | Reference Example | 0.3 | 2.5 | 0.8 | 2.5 | 1.7 | 1245 | 90 | 2.3 | 280 |
| 2 | Example | 0.3 | 2.2 | 0.9 | 2.2 | 1.3 | 1245 | 65 | 3.5 | 250 |
| 3 | Example | 0.3 | 1.7 | 0.8 | 1.7 | 0.9 | 1245 | 47 | 5.6 | 230 |
| 4 | Example | 0.3 | 1.4 | 0.7 | 1.5 | 0.8 | 1245 | 30 | 6.8 | 190 |
| 5 | Example | 0.3 | 1.0 | 0.3 | 1.1 | 0.8 | 1245 | 18 | 12.4 | 170 |
| 6 | Example | 0.3 | 0.5 | 0.4 | 1.1 | 0.7 | 1245 | 8 | 20.3 | 150 |
| 7 | Example | 0.3 | 0.3 | 0.3 | 1.0 | 0.7 | 1245 | 2 | 24.3 | 135 |
| 8 | Reference Example | 0.3 | 0.05 | 1.0 | 6.2 | 5.2 | 1245 | 95 | 1 | 320 |

Evaluation 1

Figure 2A:
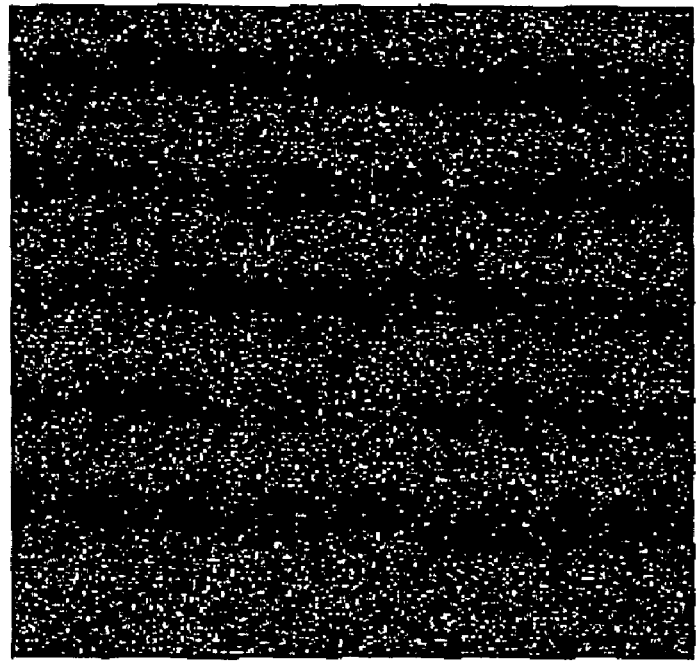
FIG. 2A is a picture of a segregated state of $SiO_2$ obtained by performing the EMPA analysis on the fine structure of a dielectric layer according to an example of the present invention.
Figure 2B:
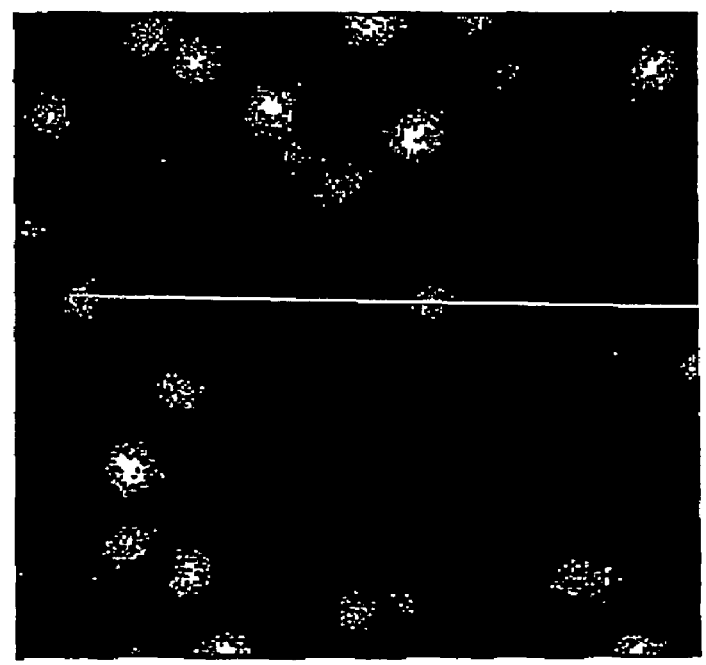
FIG. 2B is a picture of a segregated state of $SiO_2$ obtained by performing the EMPA analysis on the fine structure of a dielectric layer according to a reference example of the present invention.

Table 1 shows adding amounts of SiO₂, particle diameters of used SiO₂, firing temperatures, IR defect rates, average lifetimes (high temperature load lifetime) and C.V. values of SiO₂, and FIG. 2A and FIG. 2B show pictures of segregation states of SiO₂ obtained by performing the EMPA analysis on fine structures of dielectric layers of samples in the example and reference example. Note that FIG. 2A is a picture of dielectric layers of the sample 7 as an example, FIG. 2B is a picture of dielectric layers of the sample 1 as a reference example, and the both are pictures of a scope of 30 μm×30 μm.

From Table 1, all of the samples 2 to 7 as examples using a SiO₂ material, wherein the maximum particle diameter was 0.3 to 2.2 μm and a difference (D100-D50) between the D50 diameter and the D100 diameter was 1.5 μm or smaller, in an adding amount of 0.3 wt % with respect to the entire dielectric layer exhibited the IR defect rate of 65% or lower, which was a preferable result. Particularly, the samples 6 and 7 exhibited particularly preferable results, that the IR defect rate of 10% or lower and the average lifetime of 20 hours or longer. Also, in all of the samples 2 to 7 as examples, the C.V. value OfSiO₂ after firing was 250 or lower, and the dispersion degree of SiO₂ in the dielectric layers after Wintering was confirmed to be high.

On the other hand, the samples 1 and 8 as reference examples using SiO₂, wherein the respective maximum particle diameters were 2.5 μm and 0.05 μm and the respective differences (D100-D50) between the D50 diameter and the D100 diameter were 1.7 μm and 5.2 μm, respectively exhibited the IR defect rates of 90% and 95% and the average lifetime of 2.3 hours and 1 hour. The results indicate that they are poor in the IR defect rate and average lifetime. Also, in the samples 1 and 8 as reference examples, the respective C.V. values of SiO₂ after sintering were 280 and 320, so that the dispersion degree of SiO₂ in the dielectric layers after sintering was confirmed to be low.

Furthermore, as is obvious from FIG. 2A and FIG. 2R, in the sample 7 as an example, the dispersion degree is high in the segregation phase including SiO₂, while in the sample 1 as a reference example, it is confirmed that the particle diameter is large, the dispersion degree is low and the distribution is uneven in the segregation phase including SiO₂.

From the results, to reduce the IR defect rate and improve the high temperature lifetime (average lifetime), it was confirmed that it is preferable to use a SiO₂ material, wherein the maximum particle diameter was 0.3 to 2.2 μm and a difference (D100-D50) between the D50 diameter and the D100 diameter was 1.5 μm or smaller, by a content within the range of the present invention.

Note that from the result of the sample B as a reference example, it was confirmed that, in the case where actual particle diameters of the SiO₂ material obtained by the SEM observation wore too small, it was liable that aggregations increased and the degree of aggregation became high, so that the IR defective rate and average lifetime were deteriorated.

Example 2

Other than changing an adding amount of SiO₂ as a sub-component to 0.2 wt % and the holding temperature at firing to 1265° C., samples 11 to 18 of the multilayer ceramic capacitor were produced in the same way as in the example 1, and measurement of the IR defect rate, high temperature load lifetime and C.V. value of SiO₂ was made in the same way as in the example 1. Note that in the samples 11 to 18 in the present example, the same SiO₂ as those in the samples 1 to 8 in the example 1 were used, respectively.

TABLE 2

| Sample No. | | Adding Amount [wt %] | SiO₂ Maximum Diameter [μm] | D50 [μm] | D100 [μm] | D100 − D50 [μm] | Firing Temperature [° C.] | IR Defect Rate [%] | Average Lifetime [h] | CV value of Si after Firing [%] |
|---|---|---|---|---|---|---|---|---|---|---|
| 11 | Reference Example | 0.2 | 2.5 | 0.8 | 2.5 | 1.7 | 1265 | 76 | 7.2 | 260 |
| 12 | Example | 0.2 | 2.2 | 0.9 | 2.2 | 1.3 | 1265 | 50 | 8.7 | 224 |
| 13 | Example | 0.2 | 1.7 | 0.8 | 1.7 | 0.9 | 1265 | 32 | 11 | 206 |
| 14 | Example | 0.2 | 1.4 | 0.7 | 1.5 | 0.8 | 1265 | 21 | 12.4 | 189 |
| 15 | Example | 0.2 | 1.0 | 0.3 | 1.1 | 0.8 | 1265 | 10 | 18.1 | 145 |
| 16 | Example | 0.2 | 0.5 | 0.4 | 1.1 | 0.7 | 1265 | 0 | 26.7 | 119 |

TABLE 2-continued

| Sample No. | | SiO₂ Adding Amount [wt %] | SiO₂ Maximum Diameter [μm] | D50 [μm] | D100 [μm] | D100 − D50 [μm] | Firing Temperature [° C.] | IR Defect Rate [%] | Average Lifetime [h] | CV value of Si after Firing [%] |
|---|---|---|---|---|---|---|---|---|---|---|
| 17 | Example | 0.2 | 0.3 | 0.3 | 1.0 | 0.7 | 1265 | 0 | 32 | 100 |
| 18 | Reference Example | 0.2 | 0.05 | 1.0 | 6.2 | 5.2 | 1265 | 80 | 3.1 | 298 |

Evaluation 2

Table 2 shows adding amounts or SiO₂, particle diameters of used SiO₂, firing temperatures, IR defect rates, average lifetimes (high temperature load lifetime) and C.V. values of SiO₂.

From Table 2, all of the samples 12 to 17 as examples using a SiO₂ material, wherein the maximum particle diameter was 0.3 to 2.2 μm and a difference (D100-D50) between the D50 diameter and the D100 diameter was 1.5 μm or smaller, in an adding amount of 0.2 wt % with respect to the entire dielectric layer exhibited the IR defect rate of 65% or lower and average lifetime of 8.0 hours or longer, which were preferable results. Particularly, the samples 16 and 17 exhibited particularly preferable results that the IR defect rate of 0% and the average lifetime of 20 hours or longer. Also, in all of the samples 12 to 17 as examples, it was confirmed that the C.V. value of SiO₂ after sintering was 250 or lower, and the dispersion degree of SiO₂ in the dielectric layers after sintering was high.

On the other hand, the samples 11 and 18 as reference examples using SiO₂, wherein the respective maximum particle diameters were 2.5 μm and 0.05 μm and the respective differences (D100-D50) between the D50 diameter and the D100 diameter were 1.7 μm and 5.2 μm, respectively exhibited the IR defect rates of 76% and 80% and the average lifetime of 7.2 hours and 3.1 hours. The results indicate that the IR defect rate and average lifetime were poor. Also, in the samples 11 and 18 as reference examples, the respective C.V. values of SiO₂ after sintering were 260 and 298, so that the dispersion degree of SiO₂ in the dielectric layers after sintering was confirmed to be low.

From the results, also in the present example, wherein an adding amount of SiO₂ was 0.2 wt %, the tendency became as same as that in the example 1, and it was confirmed that the SiO₂ adding amount was preferably 0 to 0.4 wt % (note that 0 was not included) in the present invention.

Comparative Example 1

Other than changing an adding amount of SiO₂ as a subcomponent to 0.5 wt %, samples 21 to 28 of the multilayer ceramic capacitor were produced in the same way as in the example 1, and measurement of the IR defect rate, high temperature load lifetime and C.V. value of SiO₂ was made in the same way as in the example 1. Note that in the samples 21 to 28 in the present example, the same SiO₂ as those in the samples 1 to 8 in the example 1 were used, respectively.

TABLE 3

| Sample No. | | SiO₂ Adding Amount [wt %] | SiO₂ Maximum Diameter [μm] | D50 [μm] | D100 [μm] | D100 − D50 [μm] | Firing Temperature [° C.] | IR Defective Rate[%] | Average Lifetime [h] | CV value of Si after Firing [%] |
|---|---|---|---|---|---|---|---|---|---|---|
| 21 | Comparative Example | 0.5 | 2.5 | 0.8 | 2.5 | 1.7 | 1245 | x | — | 351 |
| 22 | Comparative Example | 0.5 | 2.2 | 0.9 | 2.2 | 1.3 | 1245 | x | — | 346 |
| 23 | Comparative Example | 0.5 | 1.7 | 0.8 | 1.7 | 0.9 | 1245 | x | — | 331 |
| 24 | Comparative Example | 0.5 | 1.4 | 0.7 | 1.5 | 0.8 | 1245 | x | — | 320 |
| 25 | Comparative Example | 0.5 | 1.0 | 0.3 | 1.1 | 0.8 | 1245 | 85 | 3.1 | 309 |
| 26 | Comparative Example | 0.5 | 0.5 | 0.4 | 1.1 | 0.7 | 1245 | 80 | 4 | 298 |
| 27 | Comparative Example | 0.5 | 0.3 | 0.3 | 1.0 | 0.7 | 1245 | 70 | 5 | 280 |
| 28 | Comparative Example | 0.5 | 0.05 | 1.0 | 6.2 | 5.2 | 1245 | x | — | 350 |

Note
that "x" in Table indicates that all samples short-circuited.
"—" In Table indicates unmeasurable.

Evaluation 3

Table 3 shows adding amounts of SiO₂, particle diameters of used SiO₂, firing temperatures, IR defect rates, average lifetimes (high temperature load lifetime) and C.V. values of SiO₂.

From Table 3, in the samples 21 to 28 as comparative examples, wherein the SiO₂ adding amount was made to be 0.5 wt %, all of the samples 21 to 24 and 28 resulted in short-circuiting and the samples 25 to 27 exhibited the IR defect rate of exceeding 65%. The results indicate the IR defect rate was poor. Also, in all of the samples 21 to 28, the C.V. value of SiO$_2$ after sintering exceeded 250, and the dispersion degree of SiO$_2$ in the dielectric layers after sintering was confirmed to be low.

Comparative Example 2

Other than adding Li$_2$O respectively by 0.1 wt % and 0.2 wt % instead of SiO$_2$, samples 31 and 32 of the multilayer ceramic capacitor were produced in the same way as in the sample 16 in the example 2, and measurement of the IR defect rate and high temperature load lifetime was made in the same way as In the example 2.

TABLE 4

| Sample No. | | SiO$_2$ [wt %] | Li$_2$O [wt %] | SiO$_2$ + Li$_2$O [wt %] | Firing Temperature [° C.] | IR Defective Rate [%] | Average Lifetime [h] |
|---|---|---|---|---|---|---|---|
| 16 | Example | 0.2 | 0 | 0.2 | 1265 | 0 | 26.7 |
| 31 | Comparative Example | 0.1 | 0.1 | 0.2 | 1265 | 5 | 20 |
| 32 | Comparative Example | 0 | 0.2 | 0.2 | 1265 | 10 | 15 |

Evaluation 4

Table 4 shows adding amounts of SiO$_2$ and Li$_2$O, firing temperatures, IR defect rates, and average lifetimes (high temperature load lifetime).

From Table 4, the samples 31 and 32 as comparative examples, wherein Li$_2$O having an effect as a sintering auxiliary as same as SiO$_2$ was added by 0.1 wt % and 0.2 wt % instead of SiO$_2$, exhibited a result that the IR defect rate was deteriorated and average lifetime became short comparing with those in the sample 16 as an example added with 0.2 wt % of SiO$_2$. Accordingly, it was confirmed that to reduce the IR defect rate and improve the high temperature load lifetime (average lifetime), it was preferable that an oxide of Li was substantially not included in the dielectric layer or segregation phase.

What is claimed is:

1. A ceramic electronic device having a dielectric layer, wherein:

said dielectric layer includes a main component containing a (Ba, Ca)(Ti, Zr)O$_3$ based material and a subcomponent containing an oxide of Si; and a content of said Si oxide is 0 to 0.4 wt%, note that 0 is not included, with respect to the entire dielectric layer; wherein said dielectric layer has a segregation phase; and
said segregation phase contains an oxide of Si, and contains 0.001 mol% or less of an oxide of Li; and said (Ba, Ca)(Ti, Zr)O$_3$ based material is a material expressed by a composition formula $\{\{Ba_{(1-x)}Ca_x\}O\}_A\{Ti_{(1-y-z)}Zr_yMg_z\}_BO_2$ (note that A, B, x, y and z are $0.995 \leq A/B \leq 1.020$, $0.0001 \leq x \leq 0.07$, $01 \leq y \leq 0.3$ and $0.0005 \leq z \leq 0.01$).

2. The ceramic electronic device as set forth in claim 1, wherein a C.V. value of a distribution of SiO$_2$ calculated by the formula (1) below from standard deviation σ of detection strength and average detection strength x of the SiO$_2$ distribution in said dielectric layer is 250 or lower; wherein:

C.V. value=(standard deviation σ of detection strength/average detection strength x)×100     (1).

3. The ceramic electronic device as set forth in claim 1, wherein a maximum diameter of the segregation phase existing in said dielectric layer is ½ of a thickness of said dielectric layer or smaller.

4. The ceramic electronic device having a dielectric layer according to claim 3, wherein:

said dielectric layer further contains an oxide of Mn, an oxide of Y and an oxide of V as subcomponents respectively by 0.008 to 0.33 wt % in terms of MnO
0.047 to 0.47 wt % in terms of Y$_2$O$_3$ and
0.005 to 0.30 wt % in terms of V$_2$O$_5$
with respect to the entire dielectric layer.

5. The ceramic electronic device having a dielectric layer according to claim 3, wherein said dielectric layer further contains an oxide of Mn, an oxide of Y and an oxide of V as subcomponents respectively by 0.008 to 0.33 wt% in terms of MnO
0.047 to 0.47 wt% in terms of Y$_2$O$_3$ and
0.005 to 0.30 wt% in terms of V$_2$O$_5$
with respect to the entire dielectric layer.

6. The ceramic electronic device having a dielectric layer according to claim 1, wherein said dielectric layer further contains an oxide of Mn, an oxide of Y and an oxide of V as subcomponents respectively by 0.008 to 0.33 wt% in terms of MnO
0.047 to 0.47 wt% in terms of Y$_2$O$_3$ and
0.005 to 0.30 wt% in terms of V$_2$O$_5$
with respect to the entire dielectric layer.

* * * * *